US007643536B2

(12) United States Patent
Schaefer et al.

(10) Patent No.: US 7,643,536 B2
(45) Date of Patent: Jan. 5, 2010

(54) ASYNCHRONUS COMMUNICATION SYSTEM FOR REMOTE MONITORING OF OBJECTS OR AN ENVIRONMENT

(75) Inventors: Timothy Michael Schaefer, Rochester, MN (US); Jonathan Darrel Coker, Rochester, MN (US); Rick Allen Philpott, Rochester, MN (US); Edward Brian Welch, Rochester, MN (US); David R. Holmes, III, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 818 days.

(21) Appl. No.: 10/915,576

(22) Filed: Aug. 10, 2004

(65) Prior Publication Data

US 2006/0034348 A1 Feb. 16, 2006

(51) Int. Cl.
*H04B 1/00* (2006.01)
(52) U.S. Cl. .................. 375/142; 375/143; 375/136; 375/150; 375/135; 375/146
(58) Field of Classification Search ............... 375/142, 375/143, 136, 150, 135, 146; 340/10.2; 73/146
See application file for complete search history.

(56) References Cited

U.S. PATENT DOCUMENTS

| | | | | |
|---|---|---|---|---|
| 4,744,083 A | * | 5/1988 | O'Neill et al. ............... | 714/704 |
| 5,012,113 A | | 4/1991 | Valentine et al. | |
| 5,105,376 A | * | 4/1992 | Pedron ....................... | 708/252 |
| 5,453,748 A | * | 9/1995 | Lindell ........................ | 342/51 |
| 5,539,775 A | | 7/1996 | Tuttle et al. | |
| 5,796,362 A | * | 8/1998 | Ayasli et al. .................. | 342/6 |
| 5,910,776 A | | 6/1999 | Black | |
| 6,034,635 A | * | 3/2000 | Gilhousen ................... | 342/457 |
| 6,169,494 B1 | | 1/2001 | Lopes | |

(Continued)

FOREIGN PATENT DOCUMENTS

WO    WO 03/034632 A2    4/2003
WO    WO 03/034632 A3    4/2003

OTHER PUBLICATIONS

Doug Tsuruoka, "Pentagon, IBM: Allies In Smart Tag Campaign," Investors Business Daily (no date).

(Continued)

*Primary Examiner*—Shuwang Liu
*Assistant Examiner*—Kabir A Timory
(74) *Attorney, Agent, or Firm*—Shumaker & Sieffert, P.A.

(57) ABSTRACT

A system provides for remote monitoring using asynchronous code division multiple access (CDMA) communication techniques between a base station and one or more transponders. Each transponder is attached or otherwise associated with an object or an environment to be monitored. Upon receipt of an interrogation signal, a transponder generates and transmits a coded transponder signal containing the monitored data. The coded transponder signal is generated using a spreading code. Each transponder is associated with a unique, mutually exclusive set of spreading codes. Each spreading code is based on a unique transponder address and the monitored data to be sent. A detector asynchronously monitors received signals for any of the available spreading codes. Once the detector detects a particular spreading code, the base station can identify the source transponder and extract the monitored data.

53 Claims, 11 Drawing Sheets

U.S. PATENT DOCUMENTS

| | | | |
|---|---|---|---|
| 6,333,690 | B1 | 12/2001 | Nelson et al. |
| 6,424,254 | B1 * | 7/2002 | Rydel .................... 340/426.16 |
| 6,614,387 | B1 | 9/2003 | Deadman |
| 2002/0015436 | A1 * | 2/2002 | Ovard et al. ................ 375/130 |
| 2002/0036569 | A1 * | 3/2002 | Martin .................... 340/573.1 |
| 2002/0116992 | A1 * | 8/2002 | Rickel .......................... 73/146 |
| 2002/0140598 | A1 * | 10/2002 | Stierlin et al. ................. 342/51 |
| 2002/1017580 | * | 11/2002 | Armstrong et al. ....... 340/10.31 |
| 2003/0152136 | A1 | 8/2003 | Roman |
| 2007/0248148 | A1 * | 10/2007 | Dent .......................... 375/145 |

OTHER PUBLICATIONS

"Gold Code Generator Reference Design," Altera Corporation, Mar. 2003, ver. 1.0, Application Note 295, 16 pgs.

J.R. Riley et al., "Tracking Bees with Harmonic Radar," Nature, vol. 379, Issue No. 6560, Jan. 4, 1996.

Elizabeth A. Capaldi et al., "Ontogeny of Orientation Flight in the Honeybee Revealed by Harmonic Radar," Nature, vol. 403, Issue No. 6769, Feb. 3, 2000.

Gordon Anderson et al., "RF Tagging of Insects—Honeybees for Land Mine Detection," PNNL Electronic Systems Group, William R. Wiley Environmental Molecular Sciences Laboratory, Jun. 2000.

"Radar Records Flight of the Honeybee," www.cnn.com, Feb. 4, 2000.

The International Search Report and Written Opinion for international patent application No. PCT/US2005/027769, mailed Dec. 16, 2005, (15 pages).

Notification of Transmittal of the International Preliminary Report on Patentability for corresponding patent application No. PCT/US2005/027769, mailed Sep. 26, 2006, (8 pages).

* cited by examiner

| | ADDRESS/ID BITS | | | DATA BITS | | | | | | |
|---|---|---|---|---|---|---|---|---|---|---|
| B8 | B7 | B6 | B5 | B4 | B3 | B2 | B1 | B0 | | |
| 0 | 0 | 0 | 0 ¦ 1 | 0 ¦ 1 | 0 ¦ 1 | 0 ¦ 1 | 0 ¦ 1 | 0 ¦ 1 |
| 0 | 0 | 1 | 0 ¦ 1 | 0 ¦ 1 | 0 ¦ 1 | 0 ¦ 1 | 0 ¦ 1 | 0 ¦ 1 |
| 0 | 1 | 0 | 0 ¦ 1 | 0 ¦ 1 | 0 ¦ 1 | 0 ¦ 1 | 0 ¦ 1 | 0 ¦ 1 |
| 0 | 1 | 1 | 0 ¦ 1 | 0 ¦ 1 | 0 ¦ 1 | 0 ¦ 1 | 0 ¦ 1 | 0 ¦ 1 |
| 1 | 0 | 0 | 0 ¦ 1 | 0 ¦ 1 | 0 ¦ 1 | 0 ¦ 1 | 0 ¦ 1 | 0 ¦ 1 |
| 1 | 0 | 1 | 0 ¦ 1 | 0 ¦ 1 | 0 ¦ 1 | 0 ¦ 1 | 0 ¦ 1 | 0 ¦ 1 |
| 1 | 1 | 0 | 0 ¦ 1 | 0 ¦ 1 | 0 ¦ 1 | 0 ¦ 1 | 0 ¦ 1 | 0 ¦ 1 |
| 1 | 1 | 1 | 0 ¦ 1 | 0 ¦ 1 | 0 ¦ 1 | 0 ¦ 1 | 0 ¦ 1 | 0 ¦ 1 |

FIG. 9

ASYNCHRONUS COMMUNICATION SYSTEM FOR REMOTE MONITORING OF OBJECTS OR AN ENVIRONMENT

TECHNICAL FIELD

The invention relates to communication systems and, more particularly, to remote monitoring systems.

BACKGROUND

There are many applications for monitoring objects or environments from remote locations. Such applications include identification and monitoring of objects such as files, records, books, equipment or other articles; identification and monitoring of biological tissue; or identification and monitoring of animals, insects or people. Other applications include remote monitoring of status information or sensor readings associated with each object to be monitored, such as biomedical information, information concerning whether an object has been moved or otherwise tampered with, or other status information concerning an object. Still other applications include remote monitoring of an environment for parameters such as movement, heat, light, sound, weather related parameters, or presence of airborne particles or chemicals.

One type of remote monitoring system includes a set of transponders that are attached or otherwise associated with the target objects or environments to be monitored. Each transponder carries information about the object or the environment with which it is associated. Upon receipt of an interrogation signal, the transponder generates and transmits a response. A base station interrogates the transponders, the transponders generate and transmit their responses, and the base station receives and interprets their response.

In some applications, objects are to be monitored in environments where a line-of-sight between the transponder and the base station may not always be available. Such environments may include open-field, forested, mountainous or aquatic outdoor environments in which obstructions such as trees, hills, waves or other variations may potentially interfere with communication. In urban and indoor environments, the obstructions may be buildings, walls, furniture or vehicles.

SUMMARY

In general, the invention provides a system for remote monitoring of objects or an environment. In operation, an interrogator sends out an interrogation signal at a given frequency. The interrogation signal activates each of a set of transponders within range of the interrogation signal. In response to the interrogation signal, each transponder generates and transmits a coded transponder signal. In one embodiment, each transponder is associated with a unique, mutually exclusive set of spreading codes. Each spreading code is based on a unique transponder address and the data to be sent.

After interrogation, a detector asynchronously examines incoming signals for presence of any coded transponder signals. Once presence of a particular spreading code determined, the detector may use the known allocation of spreading codes to identify the source transponder and to identify the data conveyed. The detector identifies, from the known allocation of spreading codes, which transponder sent each detected coded transponder signal as well as the data conveyed by each detected coded transponder signal.

The invention may provide one or more advantages. For example, the system allows for asynchronous communication between a detector and the transponders. Spread spectrum communication permits multiple transponders to transmit simultaneously using the same frequency with a reduced likelihood of interference. The absence of synchronicity constraints permits the transponders to respond asynchronously and intermittently or in a pulsed manner, and reduces or eliminates the need for handshaking or other types of timing techniques that may otherwise be required for synchronous communication. The asynchronous communication techniques described herein may therefore reduce the size, complexity, and power requirements of the transponder hardware.

In one embodiment, the invention is directed to a transponder comprising a clock generator that generates a transmit clock based on an interrogation signal, a code generator that generates a spreading code from a set of spreading codes allocated to the transponder using the transmit clock, and a signal generator that transmits a transponder signal that includes the spreading code.

In another embodiment, the invention is directed to a system comprising a set of one or more transponders, wherein each transponder comprises a clock generator that generates a transmit clock based on an interrogation signal, a code generator that generates a spreading code from a set of spreading codes allocated to the transponder using the transmit clock, and a signal generator that transmits a transponder signal that includes the spreading code, and a detector that acquires received signals and examines the received signals to detect presence of one or more spreading codes.

In another embodiment, the invention is directed to a method comprising sending an interrogation signal sufficient to enable communication with one or more transponders, and asynchronously examining received signal samples to detect presence of one or more of a plurality of spreading codes sent by the transponders.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a block diagram illustrating an exemplary code allocation lookup table maintained by a base station.

DETAILED DESCRIPTION

Figure 1:
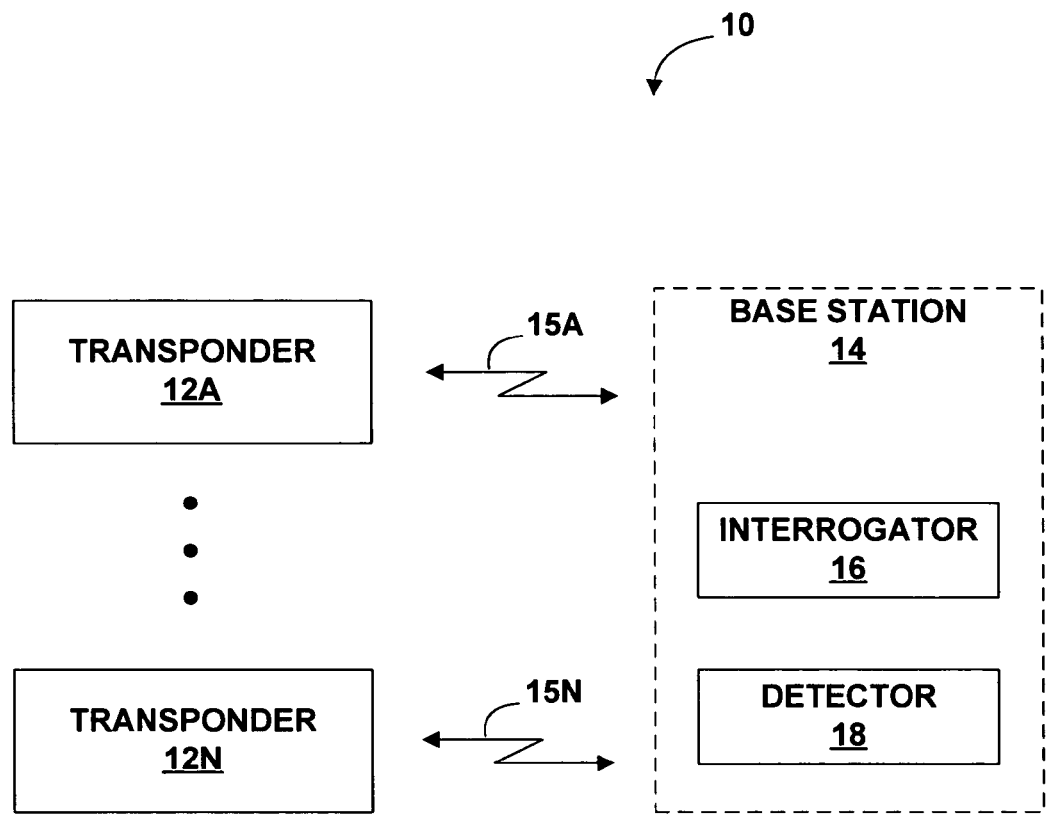
FIG. 1 is a block diagram of the system for remote tracking or monitoring in accordance with an embodiment of the invention.

FIG. 1 shows a block diagram of a system 10 for remote monitoring. System 10 includes a base station 14 and a set of transponders 12A-12N ("transponders 12"), each attached or otherwise associated with an target object to be monitored, or placed in a target environment to be monitored. System 10 may, for example, be used to monitor status information associated with animals, insects or people. System 10 may also be used to monitor status information of objects such as files, records, books, equipment, biomedical materials, or articles in a warehouse, retail store or other environment. In addition, system 10 may be used to monitor status information of a target environment. It shall be understood, therefore, that the invention is not limited with respect to the target object, target environment, or specific parameters to be monitored, and that the invention can be used for virtually any application in which remote monitoring is desired.

In the embodiment shown in FIG. 1, base station 14 includes an interrogator 16 and a detector 18. In another embodiment, interrogator 16 and detector 18 are not co-located in base station 14, but may be located separately. In another embodiment, more than one interrogator 16 and/or more than one detector 18 may be deployed. Use of multiple detectors 18 may increase the range of system 10. It shall be understood, therefore, that alternative embodiments other than the specific embodiment of system 10 shown in FIG. 1 may be used without departing from the scope of the present invention.

Interrogator 16, detector 18 and the transponders 12 communicate via wireless signals indicated generally in FIG. 1 as signals 15A-15N. In one embodiment, the signals 15A-15N are radio frequency (RF) signals. It shall be understood, however, that other frequencies could also be used without departing from the scope of the present invention.

In operation, interrogator 16 sends out a generic interrogation signal at a given frequency. In response to the interrogation signal, transponders 12 generate and transmit a coded transponder signal. In one embodiment, transponders 12 generate the coded transponder signal using spread spectrum code division multiple access (CDMA) techniques. The coded transponder signal is generated using a spreading code and includes transponder identification information and monitored data information. Each transponder may be associated with a unique, mutually exclusive set of spreading codes. Each spreading code is based on a unique transponder address and the monitored data to be sent.

Interrogator 16, transponders 12 and detector 18 communicate asynchronously. Thus, interrogator 16, transponders 12 and detector 18 have no information from each concerning the time-of-arrival nor the phase of either the interrogation signal or the coded transponder signals. Variations in the time-of-arrival of a coded transponder signal due to disparate distances between the base station and individual transponders or due to variable transponder activation latency are also not controlled or known. Detector 18 asynchronously examines received signal samples to detect presence of any of the available spreading codes. Detector 18 samples a received signal and performs a sliding correlation of the received signal with a series of ideal correlators placed at every possible phase shift along the time axis. Once the detector detects a particular spreading code, it may identify the source transponder and extract the monitored data using the known allocation of spreading codes.

The use of spread spectrum communication between interrogator 16, transponders 12, and detector 18 allows multiple transponders 12 to transmit simultaneously using the same transmit frequency with reduced interference. Also, transponders 12 may send data to base station 14 intermittently or in a pulsed manner. Furthermore, use of the asynchronous CDMA transmission techniques described herein may reduce the size, complexity, and power requirements of transponders 12.

Figure 2A:
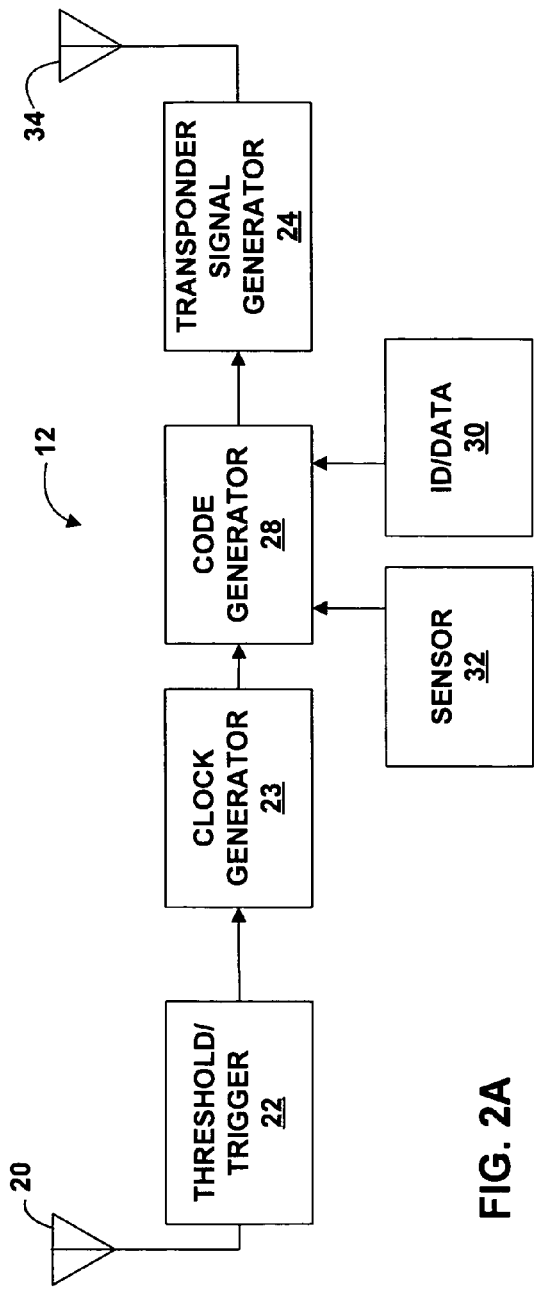
FIG. 2A is a block diagram of a transponder of the system of FIG. 1 for remote tracking or monitoring.

FIG. 2A shows a block diagram of one embodiment of a transponder 12. Operation of a single transponder 12 will be described for exemplary purposes. It should be noted, however, that each of transponders 12 in system 10 operates in a similar fashion. Transponder 12 includes transponder receive antenna 20, threshold/trigger circuit 22, clock generator 23, code generator 28, ID/data storage 30, transponder signal generator 24, and transponder transmit antenna 34. In one embodiment, transponder 12 is a passive transponder, drawing a small amount of power until it is activated by an interrogation signal from interrogator 16. Threshold/trigger circuit 22 detects receipt of an interrogation signal via transponder receive antenna 20 and "wakes up" the rest of the transponder circuitry.

Clock generator 23 generates a transmit clock based on the interrogation signal received from base station 14. Clock generator 23 may, for example, comprise a clock divider that generates a transmit clock having a frequency that is a defined fraction of the frequency of the interrogation signal. In one embodiment, clock generator 23 may be a divide-by-n circuit, where n is any integer, that generates a clock that is 1/n the frequency of the interrogation signal. For example, clock generator 23 may be a divide-by-two circuit that generates a transmit clock having a frequency of one half the frequency of the interrogation signal. In this example, an interrogation signal of 10 GHz would result in a 5 GHz transmit clock. In other embodiments, the clock generator 23 may be implemented as a clock multiplier rather than a clock divider, such as a multiply-by-n circuit. In another embodiment, clock generator 23 may generate a transmit clock having the same frequency as the interrogation signal. For example, the system 10 could be designed as a simultaneous transmit/receive system, i.e., a system in which the interrogating and transponder signals are transmitted at the same frequency. In that embodiment, transponder 12 and detector 18 may include discrimination circuitry to differentiate the interrogating and transponder signals in a manner well known in the art. It shall be understood, therefore, that the actual frequency generated by clock generator 23 may vary depending upon the particular implementation or application, and that the invention is not limited in this respect.

Figure 2B:
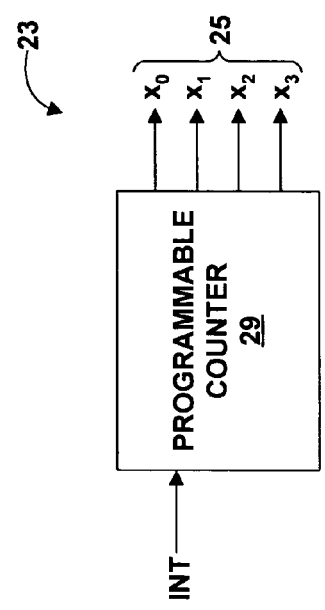
FIG. 2B is a block diagram illustrating one embodiment of a clock generator.

In one embodiment, clock generator 23 may be implemented using a programmable counter using the interrogation signal as its input. One example of such an embodiment is shown in FIG. 2B. In FIG. 2B, a programmable counter 29 is connected to receive the interrogation signal (INT) at its input. In the example of FIG. 2B, programmable counter 29 is a modulo-16 counter having outputs $z_0$-$z_3$ indicated generally by reference numeral 25. Each pulse of the interrogation signal causes the output of programmable counter 29 to increase by 1. In this way, programmable counter 29 "counts" pulses of the interrogation signal. The output pulses along each output $z_0$-$z_3$ of programmable counter 29 are thus directly related to the frequency of the interrogation signal. For example, for a modulo-16 counter, pulses appearing at output $z_0$ have half the frequency of the interrogation signal;

pulses appearing at output $z_1$ have one-quarter the frequency of the interrogation signal, etc. Programmable counter 29 thus acts as a frequency divider when implemented as clock generator 23. Clock generator 23 may also be implemented using any divide-by-n frequency divider, any multiply-by-n frequency multiplier, or may generate a clock having the same frequency of the interrogation signal.

By generating the transponder transmit clock based on the interrogation signal, several advantages may be obtained. For example, transponder 12 is not required to generate its own clock, which may reduce transponder 12 overall size and power requirements. In addition, transponder 12 could be used over a frequency range determined by the filter 62 (see FIG. 4). This allows flexibility on the frequency transmitted by interrogator 16.

Referring again to FIG. 2A, code generator 28 generates one of the spreading codes from the set of spreading codes allocated to transponder 12. Code generator 28 generates the spreading code based on transponder identification information and on the monitored data information. In particular, code generator 28 inputs a set of address bits and a set of data bits from ID/data storage 30 and outputs an n-bit spreading code based on the address and data bits. In one embodiment, each transponder 12 is assigned a unique address. This unique address forms part of the n-bit seed for the generation of the spreading code and serves to define a unique set of spreading codes allocated to each particular transponder. For example, if transponder 12 is assigned k address bits, which remain fixed, then the set of spreading codes assigned to transponder 12 contains all possible spreading code combinations with k address bits set with the unique transponder address and (n-k) bits available as data bits. Thus, for a 9-bit spreading code in which three of the bits are address bits, each transponder 12 would be allocated a set of 64 ($2^{n-k}=2^{9-3}=2^6$) mutually exclusive spreading codes.

The number of spreading codes allocated to each transponder 12 may depend on the number of transponders deployed in the system. For example, for a fixed n-bit code generator seed, the number of bits k assigned to the unique transponder address may vary depending upon the number of transponders deployed. If fewer transponders are required, fewer bits may be assigned as address bits, more bits may be available for data transmission, and each transponder may be allocated a correspondingly larger set of spreading codes. Similarly, the larger the number of transponders 12 in the system the smaller the set of spreading codes allocated to each transponder 12. It shall be understood, therefore, that the precise number of bits allocated for address and for data may be varied depending upon the number of transponders in the system, as well as upon other factors, and that the invention is not limited in either the number of transponders deployed or in the particular allocation of address and/or data bits.

Although the address bits associated with each transponder 12 and input into code generator 28 are fixed for each transponder, the data bits may vary depending upon the data to be sent. The particular spreading code generated by code generator 28 from the set allocated to transponder 12 is therefore dependent upon the data bits. In other words, for the 9-bit spreading code discussed above in which three of the bits are address bits and the six remaining bits are data bits, the allocated set of 64 mutually exclusive spreading codes corresponds to 64 different data words available to each transponder. Generation and detection of the coded transponder signals is described in further detail below.

ID/data storage 30 may be implemented using any number of storage devices known in the art, such as electrically erasable programmable read only memory (EEPROM), random access memory (RAM), read-only memory (ROM), non-volatile random access memory (NVRAM), flash memory, magnetic or optical media, or the like.

Transponder signal generator 24 modulates the carrier frequency of the coded transponder signal output by code generator 28, provides filtering and amplification of the coded transponder signal, and transmits the coded transponder signal for receipt by the base station 14 via transponder transmit antenna 34. In some embodiments, receive antenna 20 and transmit antenna 34 may be integrated as a single antenna.

The frequency or set of frequencies with which the transponders 12, interrogator 16 and detector 18 communicate may vary depending upon the application for the system and the associated environment, desired transponder size and power requirements. In one embodiment, the interrogation signal is approximately 10 GHz, with a corresponding 5 GHz coded transponder signal. This embodiment enables use of very small transponder receive and transmit antennas 20 and 34, respectively, appropriate for those applications for a transponder 12 having an extremely small form factor. The 10 GHz/5 GHz frequency set allows remote tracking and/or monitoring of objects over a range of approximately 2 km.

In another embodiment, the interrogation signal is tuned to 450 MHz with a corresponding 225 MHz transponder signal. This embodiment, while requiring a slightly larger transponder receive and transmit antennas, 20 and 34, respectively, achieves a greater range over which the transponders 12 can communicate with interrogator 16 and detector 18 and can also enable improved foliage, ground, aquatic and building penetration for applications where a line-of-sight is not always available. The 450 MHz/225 MHz set of frequencies allows remote tracking and/or monitoring of objects over a range of at least 25 kilometers.

The design of the transponder 12 may allow for a reduction in physical size, complexity and power requirements. In one embodiment, for example, the transponder 12 has a size of less than 5 mm in its longest dimension. In another embodiment, the transponder 12 has a size of less than 1 mm in its longest dimension. In another embodiment, the transponder 12 has a size of less than 0.75 mm in its longest dimension. In addition, in one embodiment, the transponder 12 has a weight of less than 20 milligrams. In another embodiment, the transponder 12 has a weight of less than 10 milligrams.

The data transmitted by transponder 12 can include status information or other data concerning the transponder 12 itself, an object with which the transponder is associated, or an environment in which the transponder is located. This status information may be obtained from sensor readings received from sensor 32. In the embodiment illustrated in FIG. 2A, code generator 28 is connected to receive status information from a sensor 32. In one embodiment, sensor 32 may measure or otherwise obtain status information associated with an object to be monitored. In another embodiment, sensor 32 may measure or otherwise obtain status information associated with the environment in which the object is located. In another embodiment, sensor 32 may measure or otherwise obtain status information concerning an environment to be monitored, in which case the transponder 12 and the sensor 32 are not necessarily attached to or associated with any particular object. In any case, transponder 12 receives the status information from the sensor 32, generates a spreading code based on the sensor data as described below with respect to FIGS. 10-12, and transmits it via a coded transponder signal for receipt and analysis by detector 18.

The type of sensor 32 may depend upon the particular application for which the system is used, and it shall be understood that the invention is not limited with respect to the type of sensor. Sensor 32 may be, for example, a medical device or other device for obtaining biomedical information such as body temperature, heart rate, blood pressure, EKG, or other biological parameter. Alternatively, sensor 32 may be, for example, a motion or tamper-proof sensor attached to the object. Sensor 32 may also be, for example, a temperature sensing device, sensor for detecting heat, light, motion, sound, velocity, acceleration, pressure or force, sensor for detecting airborne particles, chemicals or biological agents, sensor for detecting underwater activity, sensor for measuring any of a variety of weather related parameters, or virtually any other sensor type. Furthermore, sensor 32 may include more than one type of sensor for obtaining the status information for multiple parameters.

Status information received from sensor 32 or by other means may include, but is not limited to, biomedical information such as temperature, heart rate, blood pressure, EKG, or other biomedical parameters associated with a human being to be monitored. The status information may also include virtually any parameter associated with an object to be monitored, including, but not limited to temperature, speed, acceleration, force, or information regarding whether the object has been moved or otherwise tampered with. Environmental status information may include, but is not limited to the detection of movement, heat, light, sound, presence of airborne particles, chemicals or biological agents, weather related parameters, and the like.

Figure 3:
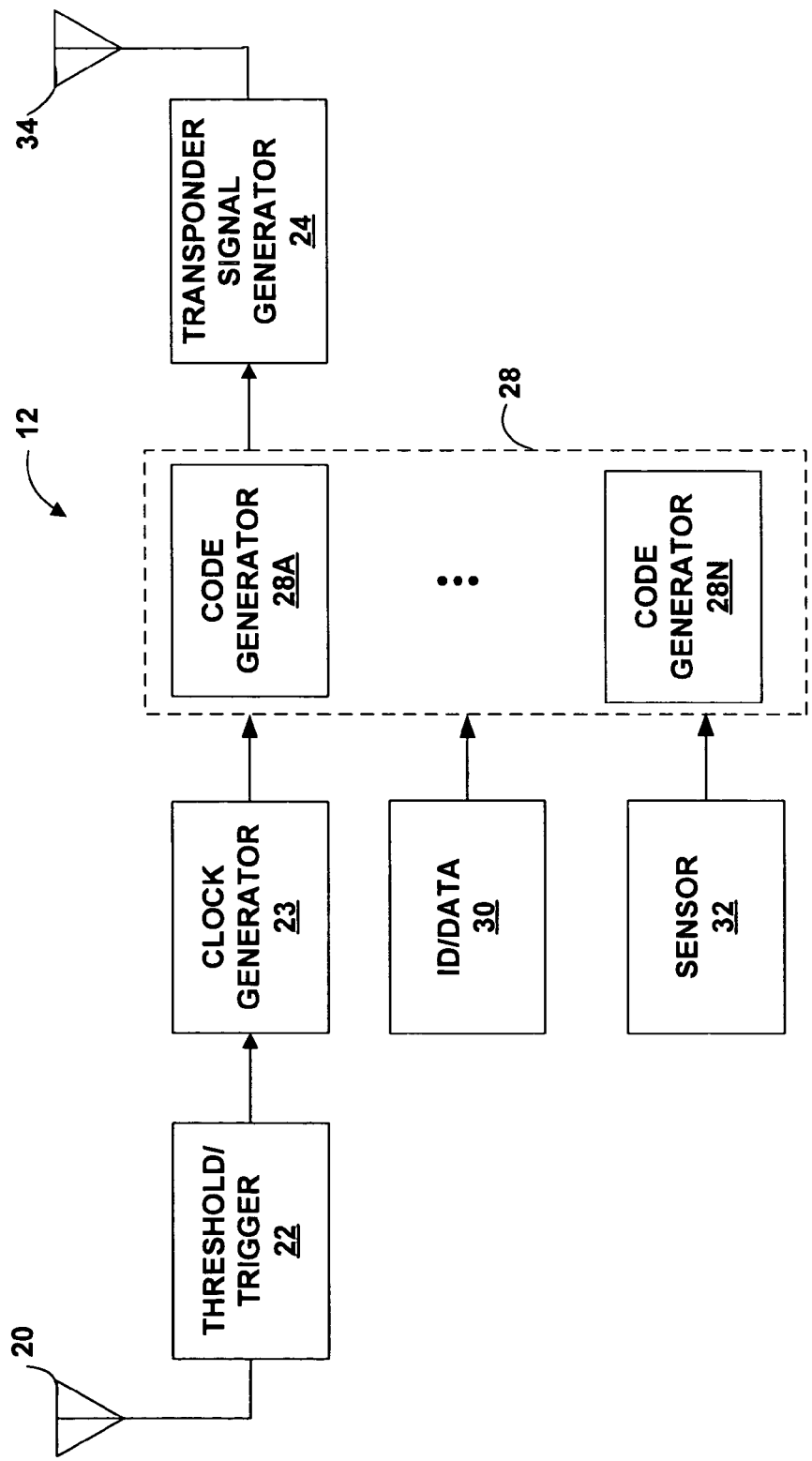
FIG. 3 shows a block diagram illustrating another embodiment of a transponder that includes multiple code generators.

FIG. 3 shows a block diagram illustrating another embodiment of a transponder 12 that includes multiple code generators 28A-28N ("28"). In this embodiment, code generators 28 may each have different "chip rates." As referred to herein, the term "chip" refers to one bit of the spreading code and the term "chip rate" refers to the rate at which a spreading code is applied. The sufficiently different chip rates of code generators 28 cause the spreading codes generated by code generators 28 to be orthogonal and significantly reduces the multiple access interference between transmissions. In some embodiments the multiple code generators 28 with different chip rates may be used alone to generate spreading codes for transponder 12. In other embodiments, however, the multiple code generators may use different chip rates along with the spreading techniques described with respect to FIG. 2 to increase the number of possible transponders 12 able to communicate with base station 14 or increase the amount of data bits conveyed by each coded signal.

Figure 4:
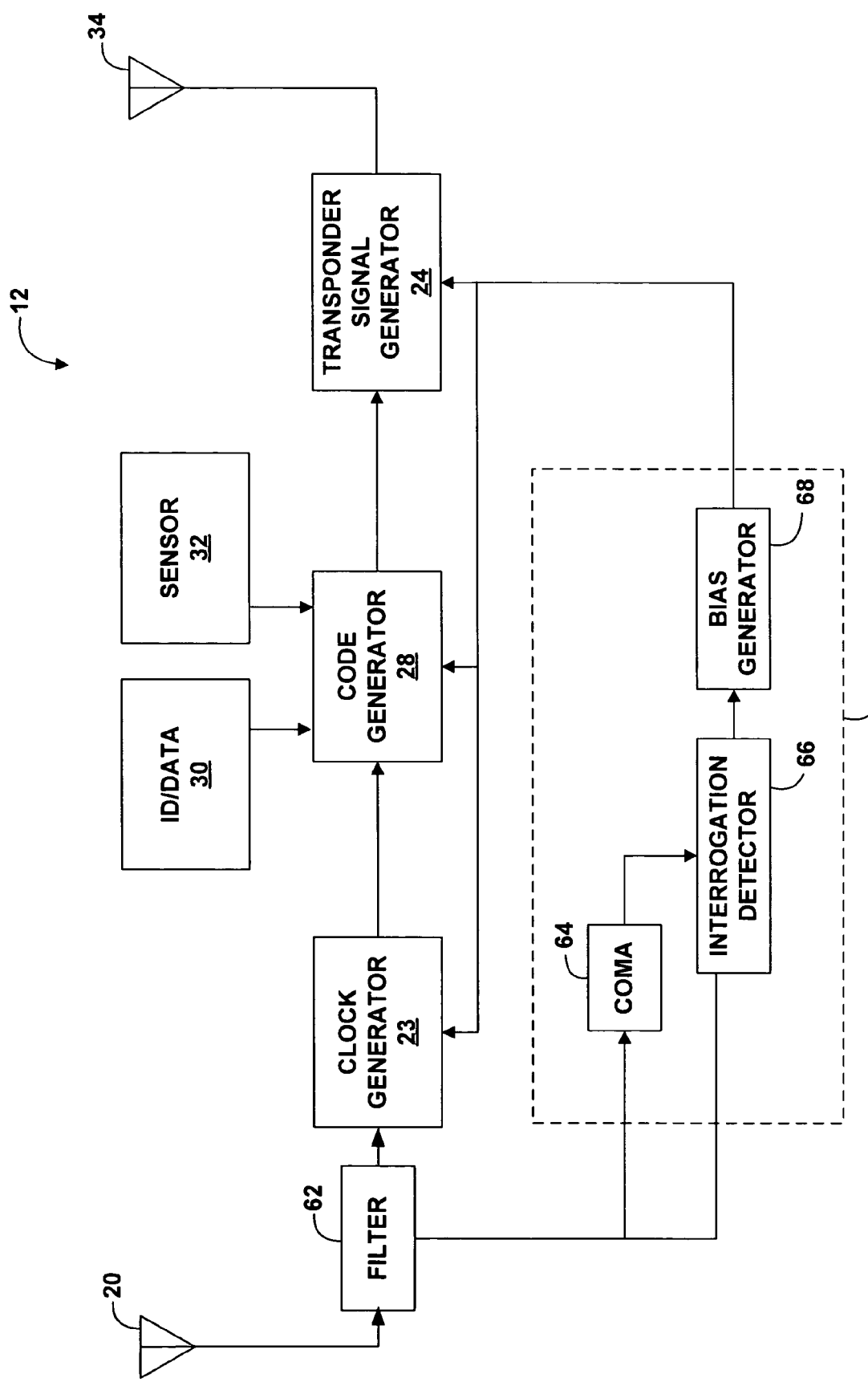
FIG. 4 is a block diagram illustrating another embodiment of a transponder.

FIG. 4 is a block diagram illustrating another embodiment of a transponder 12. The interrogation signal is received at transponder receive antenna 20. A filter 62 filters out frequencies around the interrogation signal. In one embodiment, filter 62 is a bandpass filter centered around the frequency of the interrogation signal, such as 10 GHz±100 MHz, 450 MHz±10 MHz, or other suitable band pass filter depending upon the operating frequency of system 10. In another embodiment, transponder receive antenna 20 may be implemented using a monopole, onmi-directional antenna having a very narrow bandwidth. In that case, filter 62 may not be required, resulting in a reduced transponder size.

In the embodiment of FIG. 4, transponder 12 may include three operational modes—a zero power, or "coma" mode, a low power, or "sleep" mode, and an active mode. Threshold/trigger circuit indicated generally in FIG. 4 by dashed line 22 controls these modes. At the time of manufacture, the transponder 12 is placed in coma mode and remains in coma mode, drawing limited power, until it is initially activated by an interrogation signal. In this way, the before use shelf life of transponder 12 can be maintained indefinitely. A coma circuit 64 detects receipt of an initial interrogation signal and sends a corresponding activation signal to interrogation detector 66. Coma circuit 64 can be implemented using any number of circuit elements, such as a single-shot switch, diode, transistor or the like. The generalized function of coma circuit 64 is that of a comparator circuit in which two slightly mismatched transistor circuits have slightly different voltages resulting from the mismatch. An input signal increases the bias on the lower voltage transistor circuit. Once the two transistor circuits have the same voltage the activation signal is generated. In one embodiment, the user can reset coma circuit 64 to coma mode when the transponder 12 is not in use to prolong battery life. In another embodiment, coma circuit cannot be reset, and the device remains in sleep mode after initial activation when not in the presence of an interrogation signal.

Once the transponder 12 is initially activated, it operates in "sleep" mode as a low power, passive device, drawing a small amount of power until activated by an interrogation signal. When interrogation detector 66 detects an interrogation pulse at the output of filter 62 or from antenna 20, interrogation detector 66 generates a "wake up" signal to bias generator 68. Bias generator 68 then applies power to clock generator 23, code generator 28, and transponder signal generator 24. Transponder signal generator 24 amplifies conditions and amplifies the coded signal from code generator 28, and boosts the power of the coded transponder signal. The output of transponder signal generator 24 is connected to transponder transmit antenna 34. In one embodiment, transponder transmit antenna 34 is a 5 GHz antenna which transmits a 5 GHz coded transponder signal. In another embodiment, transponder transmit antenna 34 is a 225 MHz antenna for transmission of a 225 MHz transponder signal. Again, it shall be understood that the invention is not limited with respect to the particular frequencies used for the interrogating and transponder signals, and that any appropriate frequencies could be substituted for the specific embodiments described without departing from the scope of the present invention.

Figure 5:
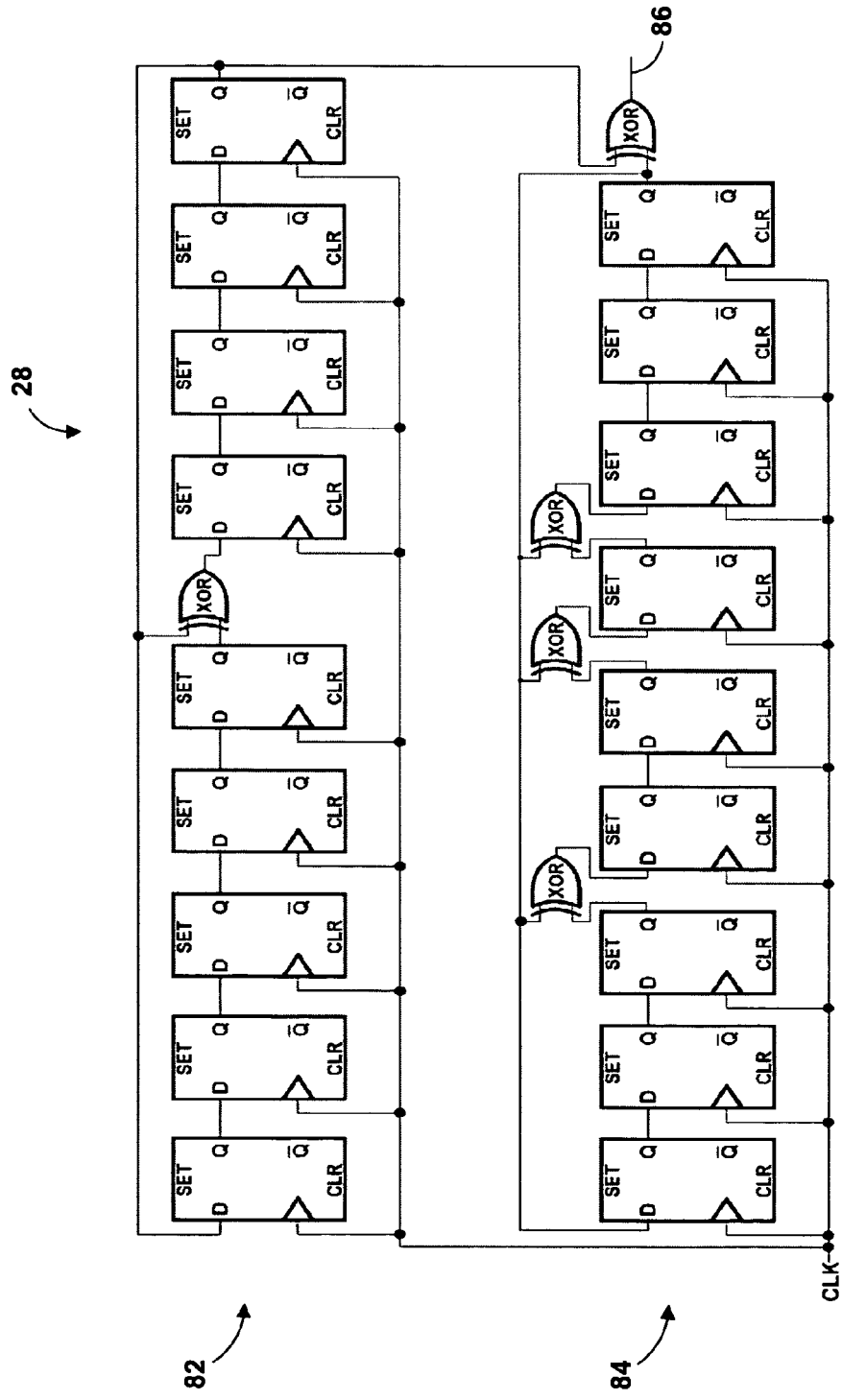
FIG. 5 shows a digital logic implementation diagram of a code generator.

FIG. 5 shows a digital logic implementation diagram of one embodiment of code generator 28. As discussed above, code generator 28 employs a spread spectrum technique using wideband, noise-like signals to increase bandwidth occupancy. The spread spectrum techniques allow signals transmitted by each transponder to be uniquely identified among other transponder signals transmitted at the same frequency. In this way, multiple transponder signals may occupy the same transmit frequency bandwidth with minimum interference.

In one embodiment, code generator 28 generates coded transponder signals using "Gold codes," a spread spectrum communication technique known to those of skill in the art. Gold codes are based on pseudorandom noise (PN) sequences having a period of $2^n-1$, where n is the number of stages in the linear feedback shift registers (LFSR) used to generate the code. The number n is determined based on the application in which the system is to be implemented and the associated data or message transmission requirements.

In one embodiment, for example, the LFSR length may be 9-bits that may be seeded with a data packet including four bits of address and five bits of data, such as status or other information. FIG. 5 shows an example implementation of a code generator 28 that generates a spreading code based on a 9-bit seed having a 4-bit address. Code generator 28 includes upper 82 and lower 84 9-bit Galois form linear feedback shift registers (LFSR), each of which generates a PN sequence having a period of $2^{9-1}$. Upon receipt of the interrogation signal, the lower LFSR 84 is seeded with a non-zero constant and the upper LFSR 82 is seeded with the 9-bit data packet (4-bit address and 5-bit data) contained in ID/data storage 30.

The last four shift registers of the upper LFSR 82 are seeded with the 4-bit address from ID/data storage 30. As described above, this 4-bit address is unique to each transponder so as to define a set of spreading codes uniquely associated with transponder 12. In other words, the transponder 12 is allocated all possible spreading codes ($2^{(n-k)}$) that may be generated with k fixed address bits, in this case 32 ($2^{(9-4)}=2^5$). If more transponders are deployed, the system may require a larger number of uniquely assigned address bits. Similarly, fewer transponders may result in the system assigning fewer bits of the n-bit LFSR seed as address bits.

The other five shift registers of upper LFSR 82 receive data from ID/data storage 30. The data received by these five registers varies depending on the data to be sent. The two PN sequences generated by the upper LFSR 82 and the lower LFSR 84 are combined using an exclusive-OR binary logic gate (i.e., modulo-2 added) to produce the resulting Gold code sequence at output 86. It shall be understood that although a 9-bit Gold code is shown in FIG. 5, the invention is not limited in this respect. When a smaller or larger number of bits for the LFSR seed is desired, a code generator implementing a shorter or longer period Gold code could be used in place of the specific embodiment shown in FIG. 5 without departing from the scope of the present invention. For a 17-bit LSFR seed, for example, a Gold code having a period of $2^{17}-1$ could be used. An n-bit LFSR seed would have a corresponding Gold code of period of $2^n-1$. More detail on Gold codes and their implementation can be found in Gold, R. *"Optimal Binary Sequences for Spread Spectrum Multiplexing"* IEEE Transactions on Information Theory volume IT-13 pp 619-621 October 1967, and Gold, R. *"Maximal Recursive Sequences with 3-Valued Recursive Cross Correlation Functions"* IEEE Transactions on Information Theory volume IT-14 pp 154-156 January 1968.

In addition, although FIG. 5 is described with respect to Gold code spread spectrum techniques, it shall be understood that the invention is not limited to the use of Gold codes. The techniques of the invention may be implemented using any orthogonal signals. The orthogonal signals may be binary, such as Gold codes or Kasami codes, or multi-level (i.e., non-binary) spreading codes.

Figure 6:
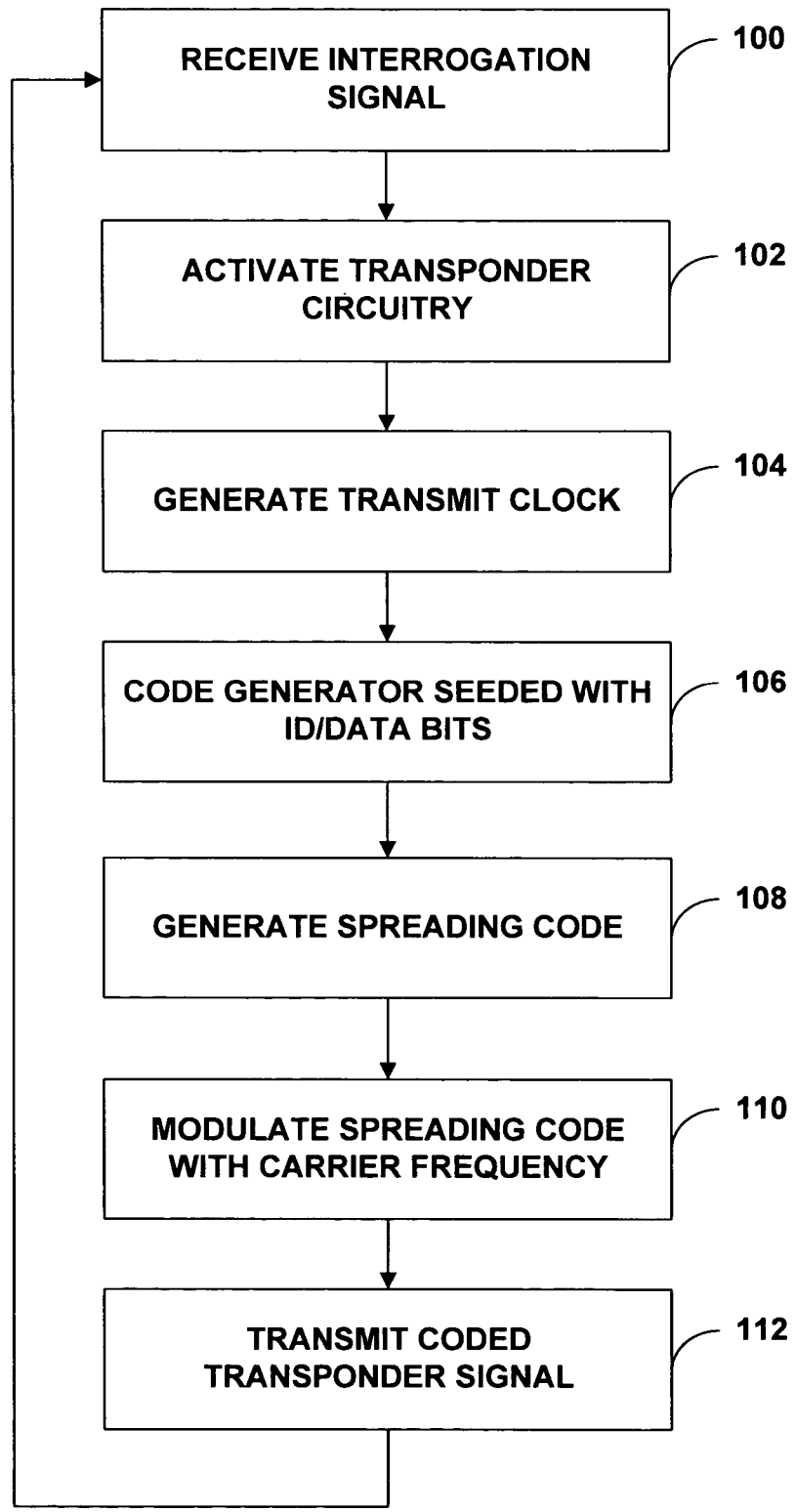
FIG. 6 is a flow diagram illustrating exemplary operation of a transponder generating and sending a coded transponder signal to base station.

FIG. 6 is a flow diagram illustrating exemplary operation of a transponder 12 generating and transmitting a coded transponder signal. Initially, the transponder 12 receives an interrogation signal from interrogator 16 (100). Transponder 12 activates its circuitry in response to receiving the interrogation signal (102). For example, transponder 12 may generate a "wake up" signal and apply power to clock generator 23, code generator 28, and transponder circuit components. Clock generator 23 then generates a transmit clock based on the interrogation signal (104). For example, clock generator 23 may be a clock divider, such as a divide-by-n circuit, that generates a clock having a frequency of 1/n the frequency of the interrogation signal. Code generator 28 is then seeded with the address and/or data bits from ID/data storage 30 (106). Code generator 28 next generates a spreading code (108). Transponder signal generator 24 modulates the spreading code with the carrier frequency (110). The resulting coded transponder signal is transmitted via transponder transmit antenna 34 (112).

Figure 7:
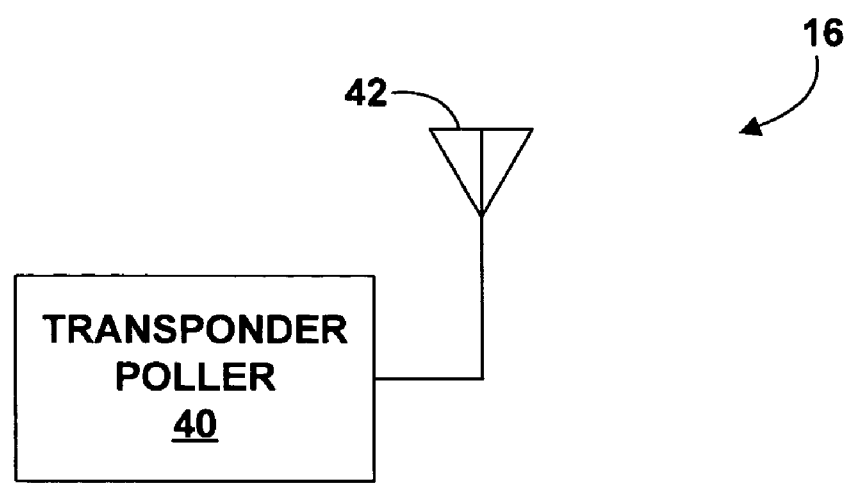
FIG. 7 is a block diagram of an interrogator of the system of FIG. 1 for remote tracking or monitoring.

FIG. 7 shows a block diagram of interrogator 16. Interrogator may be co-located with a detector 18 in a base station 14 as shown in FIG. 1, or may be located remotely from detector 18. Multiple interrogators 16 may also be used. Interrogator 16 includes transponder poller 40 and an interrogator transmit antenna 16. Transponder poller 40 generates a generic RF interrogating pulse at the base station signal frequency, such as 10 GHz, 450 MHz, or other suitable frequency depending upon the particular application in which the system is to be used. This interrogating pulse activates each transponder 12 in the system, causing them to generate and transmit corresponding coded transponder signals.

Figure 8:
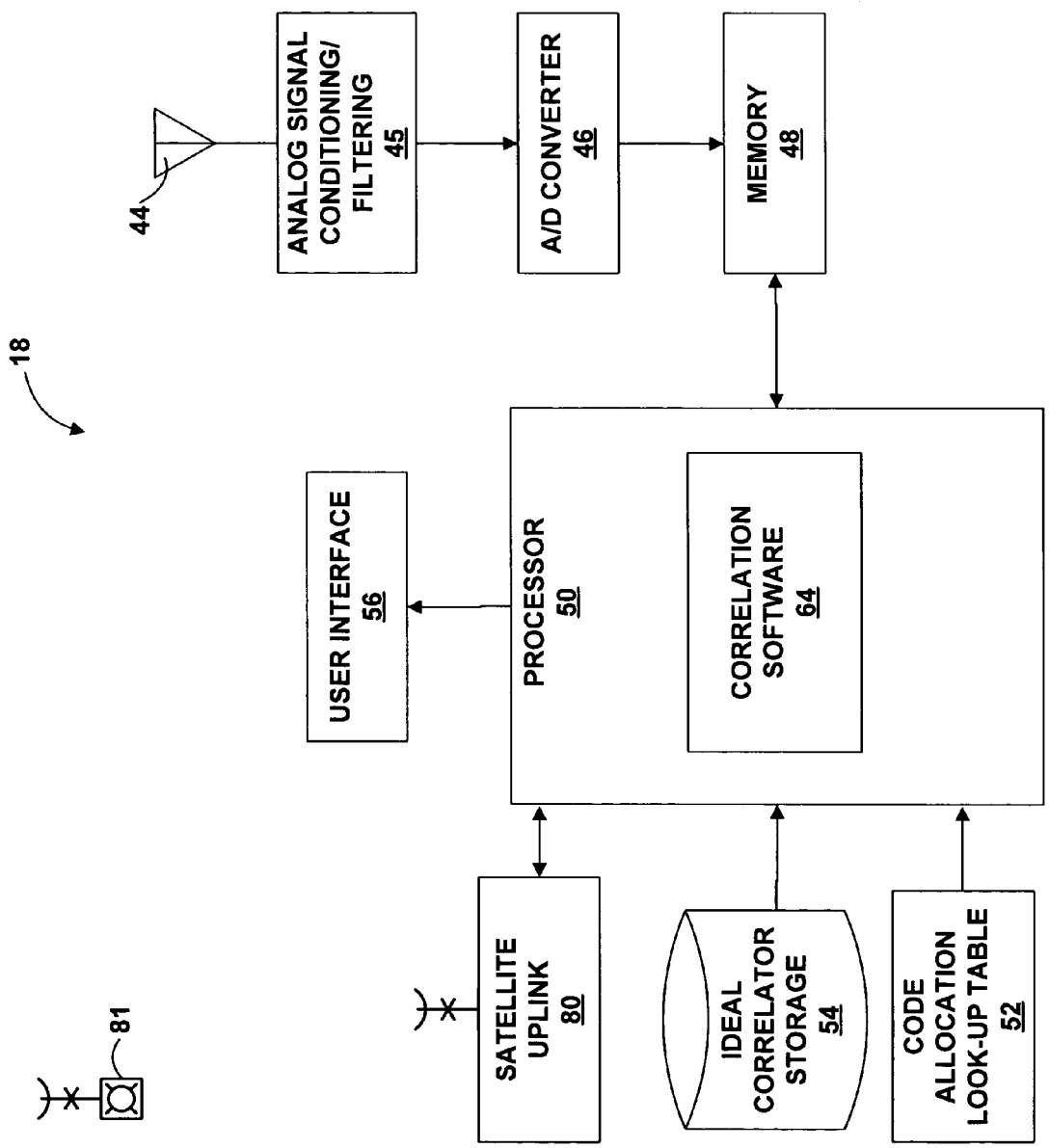
FIG. 8 is a block diagram showing one embodiment of a detector of the system of FIG. 1 for remote tracking or monitoring.

FIG. 8 shows a block diagram of detector 18. Detector 18 may be co-located with an interrogator 16 in a base station 14 as shown in FIG. 1, or may be located remotely from the base station 14 and/or the interrogator 16. Also, multiple detectors 18 may be employed to increase the range of the system 10. Incoming signals are received by detector receive antenna 44, which may be, for example, a parabolic reflector or other type of receive antenna of a type well known to those of skill at the art. The received signals are conditioned and filtered by analog signal conditioning and filtering module 45, converted to digital form by A/D converter 46 and stored in memory 48.

After interrogation, detector 18 examines incoming received signals for presence of any of the possible coded transponder signals. The interrogator 16, detector 18 and the transponders 12 communicate asynchronously. Thus, detector 18 has no information concerning the start and stop time points (in other words, neither the time-of-arrival nor the phase) of any transmitted spreading code within the received signal. In other words, detector 18 determines presence of a coded transponder signal without having any information concerning the time-of-arrival or the phase of any coded transponder signal present in the received signal.

To detect presence of any one of the available spreading codes, detector 18 includes a processor 50 that asynchronously examines incoming signals to determine whether the received signals include any one of the possible spreading codes. Because a coded transponder signal may occur anywhere in a given received signal, processor 50 includes a correlation module 62 which performs a sliding correlation of the received signal with a series of ideal correlators placed at every possible shift along the time axis for each of the possible ($2^n$) spreading codes. In one embodiment, the full correlation is calculated using Fourier transform methods. The full correlation yields a long vector of values, one correlation value for each possible time shift of the correlator, which may be, for example, the number of sample points in the received signal. The decision of whether or not a particular code is actually present within the received signal may be based on the maximum or peak correlation value for that code. If the maximum correlation value exceeds a certain threshold, the code is determined to be present (see FIGS. 11A and 11B).

Processor 50 retrieves a sample of the received signal from memory 48 as well as an ideal correlator from ideal correlator storage 54. Ideal correlator storage 54 stores the series of ideal correlators placed at every possible shift along the time axis for each of the possible spreading codes. If transponders 12 and detector 18 communicate using an n-bit data packet, for example, ideal correlator storage 54 stores $2^n$ ideal code correlators. For a 9-bit data packet, for example, ideal correlator storage contains 512 ($2^9$) ideal code correlators. Each ideal code correlator is an ideal representation of a signal that corresponds to a particular spreading code. Correlation module 64 correlates the sample of the received signal with the ideal code correlator to determine whether the received signal includes a spreading code.

Correlation module 64 may perform the correlation using Fourier analysis, using a match filter, or other correlation technique. In one embodiment, the discrete circular correlation ($c[k]$) of the ideal code correlator ($x[n]$) and the sample received signal ($y[n]$) can be calculated using the discrete Fourier transforms of x[n] and y[n] via the Fourier Correlation Theorem:

$$c[k]=\text{IFFT}\{\text{FFT}\{x[n]\}(\text{FFT}\{y[n]\})^*\}$$

where FFT and IFFT refer to the discrete Fast Fourier Transform and Inverse Fast Fourier Transform operations respectively and "*" denotes the complex conjugate operator. In another embodiment the mathematically equivalent discrete circular correlation of the ideal code correlator (x[n]) and the sample received signal (y[n]), is calculated by:

$$\text{Correlation}(x[n], y[n]) = c[k] = \sum_{n=0}^{N-1} x[(n+k)\bmod N]y[n]$$

for $k = 0$ to $N-1$ where the integer k is the relative shift between the two signals, "mod" refers to the modulo operation, and N is the length of the sampled signals. In one embodiment, each ideal code correlator may be stored as a Fourier representation of the ideal signal in order to reduce the number of operations performed by correlation module 64. Correlation module 64 may, in some instances, compute a normalized correlation. For example, processor 50 may normalize the correlation between the received signal and the ideal code correlator to a value between zero and one.

Figure 11A:
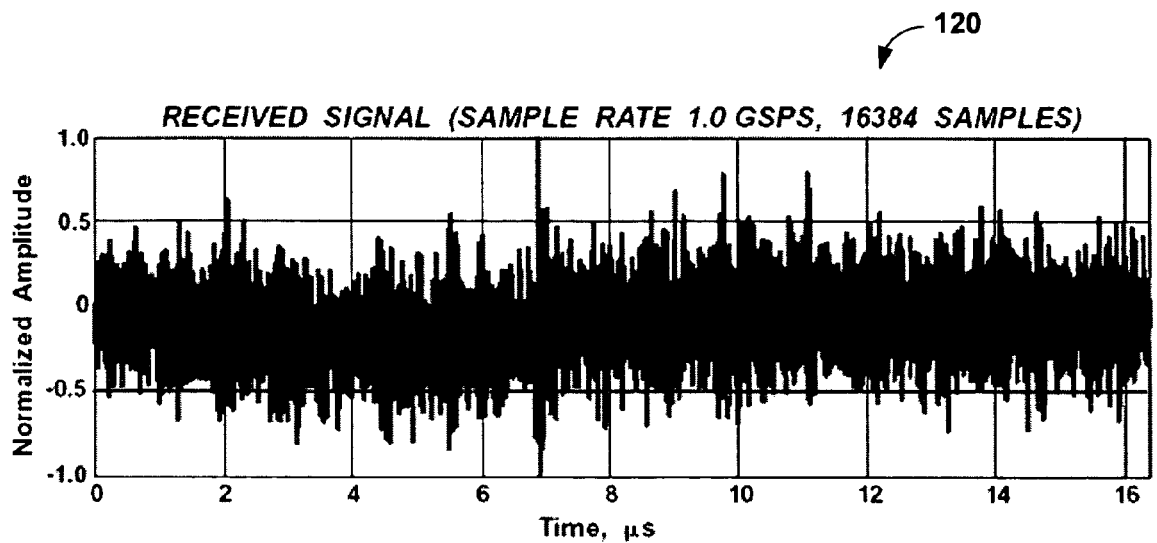
FIG. 11A illustrates a graph of a received signal sample and FIG. 11B illustrates a graph of a normalized correlation of the received signal shown in FIG. 11A.
Figure 11B:
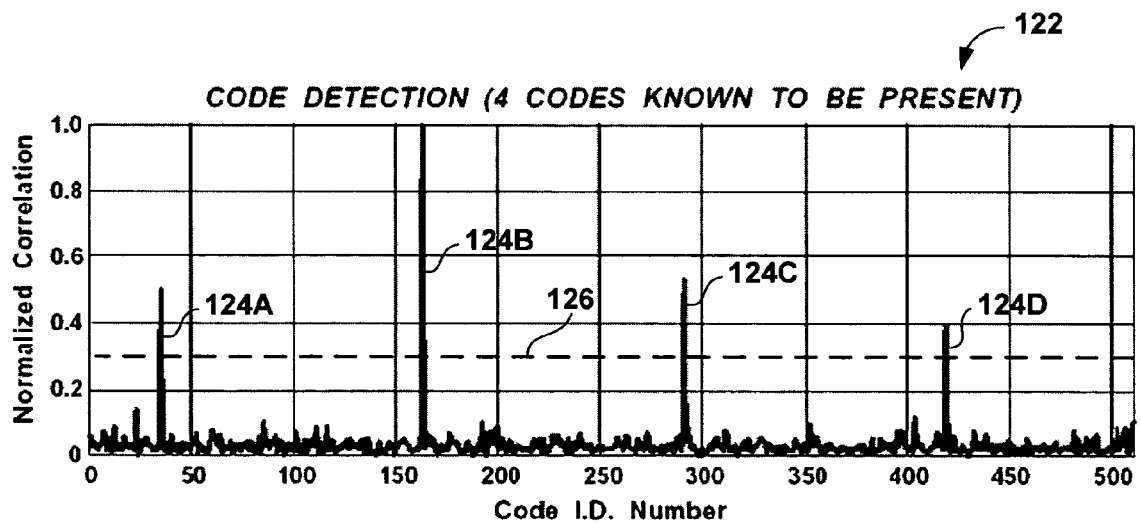

Correlation module 64 applies detection criterion to the correlation to determine whether the received signal is from one of the transponders 12 (see FIGS. 11A and 11B, for example). The detection criterion may, for example, be a threshold detection criterion. For example, if correlation module 64 computes a normalized correlation between zero and one, correlation module 64 may determine that a spreading code exists if the correlation is above some defined fraction of the maximum value. In one embodiment, the detection criterion may be time sensitive. For example, correlation module 64 may lower the threshold detection criterion when a correlation occurs later in time with respect to the interrogation signal. The time sensitive detection criterion may increase the likelihood of detecting coded transponder signals 12 whose signal amplitude has decreased due to greater distance from detector 18.

If correlation module 64 detects existence of a spreading code from the correlation, processor 50 accesses a code allocation lookup table 52 (see FIG. 9) to identify the transponder 12 from which the signal was sent as well as the data conveyed by the coded transponder signal. Code allocation lookup table 52 maps the possible spreading codes to the appropriate source transponder. In addition, code correlation lookup table 52 indicates which of the bits in the spreading code contain data and which are address bits. Correlation module 64 decodes the coded transponder signals and stores the transmitted data in memory 48. Correlation module 64 may further display the received monitoring information on display 56.

Regardless of whether correlation module 64 finds a match via the correlation, correlation module 64 retrieves another ideal correlator for a different spreading code from ideal correlator storage 54 and performs a correlation on the same sample of the received signal. Because transponders 12 and base station 14 communicate asynchronously, more than one spreading code may be present in each acquired sample of the received signal. Thus, processor 50 compares each sample of the incoming signal with all of the ideal correlators in ideal correlator storage 54. Correlation module 64 continues to correlate the sample of the received signal until all of the ideal code correlators have been correlated with that sample of the incoming signal. Correlation module 64 acquires and correlates each sampled signal with all of the ideal code correlators, storing and/or displaying the monitored information received in any coded transponder signals.

Correlation module 64 may be embodied as one or more devices that include logic circuitry to carry out the functions or methods as described herein. The logic circuitry may include a processor that may be programmable for a general purpose or may be dedicated, such as microcontroller, a microprocessor, a Digital Signal Processor (DSP), Application Specific Integrated Circuit (ASIC), and the like. Processor 50 is not necessarily associated with any particular computer or other apparatus, but may be carried out by various general-purpose or specialized machines. The instructions may be distributed among two or more media and may be executed by two or more machines. The machines may be coupled to one another directly, or may be coupled through a network, such as a local access network (LAN), or a global network such as the Internet.

Software running in processor 50 and in correlation module 64 may be used for performing the continuous signal correlation and detection of transponder signals described above. The software may be stored in a computer-readable medium that includes instructions for causing a programmable processor to carry out the methods described above. The computer-readable medium may include but is not limited to random access memory (RAM), read-only memory (ROM), non-volatile random access memory (NVRAM), electrically erasable programmable read-only memory (EEPROM), flash memory, magnetic or optical media, or the like. The instructions may be implemented as one or more software modules, which may be executed by themselves or in combination with other software.

As illustrated in FIG. 8, detector 18 may be (but need not necessarily be) configured for global monitoring of transponders 12. Processor 50 may communicate via satellite uplink 80 with a network of orbiting satellites designated generally by reference numeral 81. Each detector 18 may uplink tracking and/or monitoring information received from local transponders to one of more satellites via satellite uplink 80. Each detector 18 may also downlink tracking and/or monitoring information from other base stations and their associated local transponders to enable tracking of transponders located in other regions. In this way, a plurality of base stations can be deployed at various locations on the earth and transponder activity within range of those base stations can be monitored on a global basis.

FIG. 9 is a block diagram illustrating an exemplary code allocation lookup table 52 maintained by detector 18 to identify a source transponder and data conveyed by a received coded transponder signal. Code allocation lookup table 52 is a table in which each row represents a set of spreading codes allocated to a transponder 12. As described above, each of the transponders is assigned a unique address and a corresponding fixed number of address bits 51. In the example shown in FIG. 9, the n-bit spreading code is a 9-bit spreading code with 3-bit (k=3) address bits. In the example illustrated, each of the transponders 12 is assigned three fixed address bits 51, i.e., bits B6-B8, thus allowing for eight ($2^k=2^3$) transponders to transmit coded signals concurrently. The remaining data bits 53, i.e., B0-B5, allow each transponder to covey six bits of information. Since each bit B0-B5 can be set to either one or zero depending upon the data to be conveyed, each of transponders 12 is allocated sixty-four ($2^{(n-k)}=2^{(9-3)}=2^6=64$)

spreading codes. Transponders 12 generate one of those sixty-four spreading codes based on the data conveyed.

The example look-up table shown in FIG. 9 is illustrated for exemplary purposes, and may be readily varied. For example, although FIG. 9 illustrates a 9-bit data packet, a larger or smaller n-bit data packet may be used depending upon the application. The division of the available n-bits into address and data bits may also vary depending on the application. For example, the number of assigned address bits (k) may vary depending upon the number of transponders present in the system. The number of resulting data bits may also vary based on the total number of bits in the data packet and the number of assigned address bits. Furthermore, the assigned address bits need not be the most significant bits of the n-bit data packet. For example, the assigned address bits may be bits B0-B2. Moreover, the address bits need not be consecutive bits in the n-bit data packet. For instance, the three assigned address bits may be bits B7, B4 and B0. In addition, for a differently sized n-bit data packet, the size of code allocation lookup table 52 would be correspondingly larger or smaller.

Figure 10:
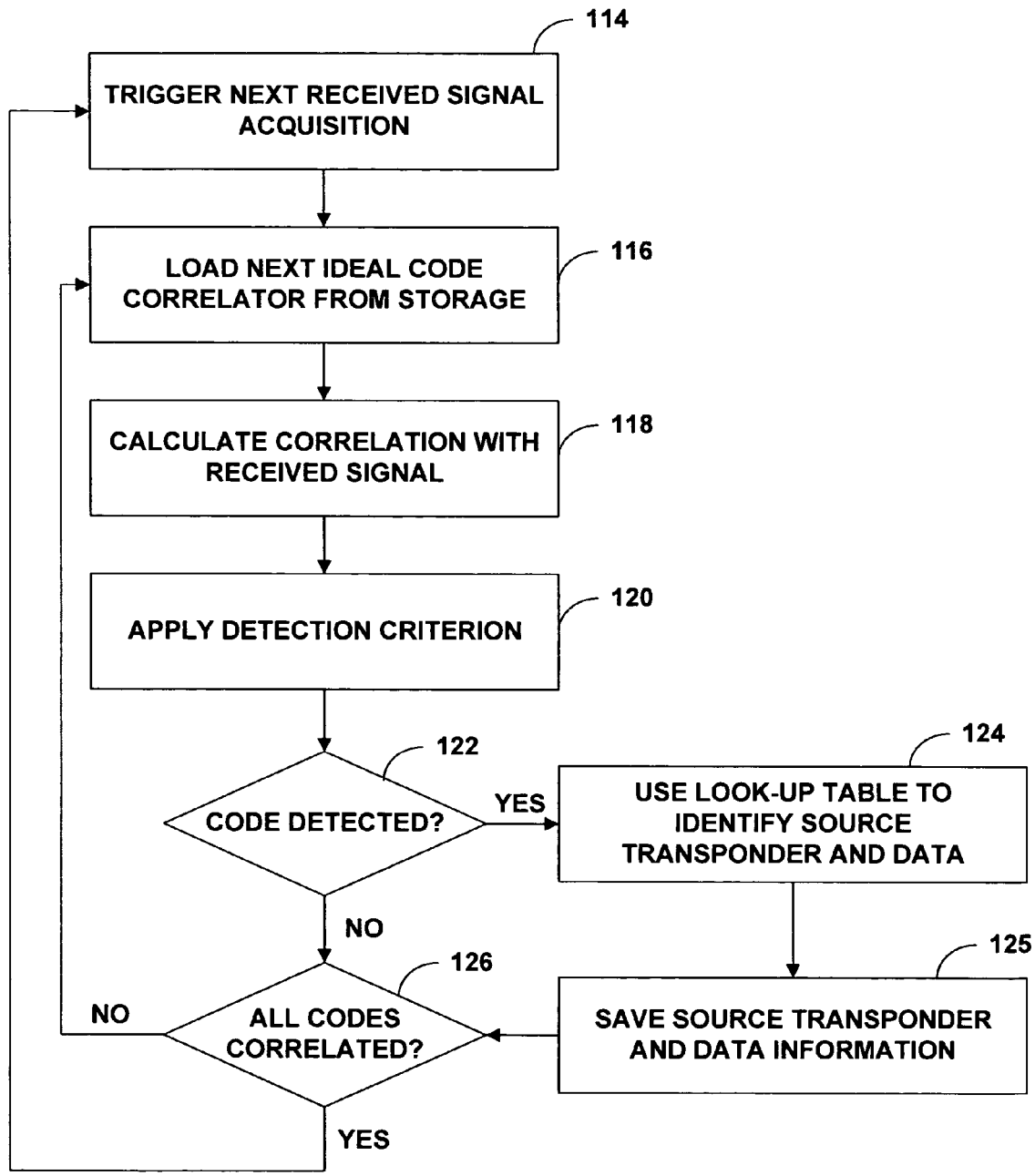
FIG. 10 is a flow diagram illustrating exemplary operation of a detector decoding a coded transponder signal.

FIG. 10 is a flow diagram illustrating exemplary operation of a detector 18 decoding a coded transponder signal. Initially, detector 18 triggers a received signal acquisition (114). Detector 18 then loads an ideal code correlator from ideal code correlator storage 54 (116). As described above, the ideal code correlator is an ideal representation of a received signal that corresponds to a particular spreading code. Detector 18 calculates a sliding correlation with the received signal (118). Detector 18 may calculate the correlation in the time domain or using Fourier analysis. Detector 18 applies a detection criterion to the correlation to determine whether the received signal is from one of the transponders 12 (120). The detection criterion may, for example, be a threshold detection criterion. Based on the applied detection criterion, detector 18 determines whether a spreading code is present (122).

Detector 18 may detect presence of a spreading code, for example, when the normalized correlation exceeds the threshold detection criterion. When the normalized correlation does not exceed the threshold detection criterion, detector 18 may determine that no spreading code is present. When a spreading code is detected, detector 18 accesses look-up table 52 to identify the correct source transponder and to identify the data conveyed (124). Detector 18 extracts and stores the address and the data information in memory 48 (125).

Whether a spreading code is detected or not, detector 18 determines whether all of the possible spreading codes have been correlated (126). If all of the spreading codes have not been correlated with the signal acquisition, detector 18 loads the next ideal code correlator from ideal code correlator storage 54 (116) and goes through the detection steps with the next ideal code correlator. When all codes have been correlated (126), detector 18 triggers the next received signal acquisition (114) and goes through the detection steps again. Detector 18 proceeds in this manner, continuously searching for presence of all the possible spreading codes. Detector 18 performs a sliding correlation of every possible spreading code with the incoming received signal.

The present system allows for asynchronous communication between the transponders and the base station. Assigning a unique set of spreading codes to each transponder allows multiple transponders to transmit asynchronously using the same transmit frequency with reduced interference between transponder signals. Asynchronous analysis of acquired signals allows base station 14 to receive and discriminate between the multiple transponder signals.

FIG. 11A illustrates a graph 120 of an example received signal sample and FIG. 11B illustrates a graph 122 of a normalized correlation of the example received signal shown in graph 120. The received signal sample shown in FIG. 11A was sampled at a rate of 1 giga-sample per second (GSPS) over an approximately 16 μs time frame. This example uses a 9-bit data packet and 3-bit address to produce a total of 512 possible spreading codes. Graph 122 of FIG. 11B illustrates the correlation calculated by processor 50. Processor 50 has normalized the correlation for each of the 512 possible spreading codes in the system between a normalized range between 0 and 1.0. To determine whether any spreading codes are present, processor 50 may apply a threshold 126 to the normalized signal. For example, processor 50 may apply a threshold 126 of 0.3 to the normalized signal. In the example shown in FIG. 11B, four $9^{th}$ order spreading codes are present in the signal, one corresponding to each peak 124A, 124B, 124C and 124D that exceeds the 0.3 threshold 126. Once the spreading codes are identified, processor 50 may access code allocation lookup table 52 to identify the transponder and the data associated with each spreading code. As discussed above, processor 50 may apply a reduced threshold later in time to account for any reduction in signal amplitude for transponders that are farther away from the base station.

In one embodiment, threshold 126 may decrease with time to take into account decreases in transponder signal amplitude as the distance between transponder 12 and detector 18 increases. This may increase the likelihood that all transponder signals sent in response to an interrogation signal will be detected, even as their distance from the detector increases.

Various embodiments of the invention have been described. These embodiments are illustrative of the practice of the invention. Various modifications may be made without departing from the scope of the claims. For example, the techniques may be used in conjunction with other modulation techniques such as binary phase shift keying (BPSK), varying chip rates, or the like. Furthermore, the CDMA techniques described above may be combined with other spread spectrum techniques such as frequency division multiple access (FDMA) and time division multiple access (TDMA). These and other embodiments are within the scope of the following claims.

The invention claimed is:

1. A transponder comprising:
    a clock generator that generates a transmit clock based on an interrogation signal;
    a code generator that generates an n-bit spreading code from a unique set of at least two spreading codes allocated to the transponder from among a plurality of available spreading codes using the transmit clock, wherein the code generator inputs a set of address bits and a set of data bits from a storage device and generates the n-bit spreading code based on the set of address bits and the set of data bits, wherein the unique set of at least two spreading codes are allocated to the transponder based on transponder identification information; and
    a signal generator that transmits a transponder signal that includes the n-bit spreading code, the transponder signal having a transmit frequency determined by the transmit clock.

2. The transponder of claim 1, wherein the clock generator frequency modulates the interrogation signal to generate the transmit clock.

3. The transponder of claim 1, wherein the clock generator comprises a clock divider that divides an interrogation signal frequency to determine the transmit clock frequency.

4. The transponder of claim 3, wherein the clock divider comprises a divide-by-n circuit.

5. The transponder of claim 1, wherein the clock generator comprises a clock multiplier that multiplies an interrogation signal frequency to determine a transmit clock frequency.

6. The transponder of claim 1, wherein the set of spreading codes comprise substantially orthogonal spreading codes.

7. The transponder of claim 1, wherein the set of spreading codes comprise binary spreading codes.

8. The transponder of claim 7, wherein the binary spreading codes comprise one of Gold codes and Kasami codes.

9. The transponder of claim 1, wherein the set of spreading codes comprise multi-level spreading codes.

10. The transponder of claim 1, wherein the address bits comprise the transponder identification information.

11. The transponder of claim 10, wherein the address bits define the unique set of spreading codes allocated to the transponder.

12. The transponder of claim 1, wherein the code generator includes an upper linear feedback shift register and a lower linear feedback shift register, each of which generates a pseudorandom noise sequence.

13. The transponder of claim 12, wherein the pseudorandom noise sequences have a period of $2^n-1$.

14. The transponder of claim 12, wherein the pseudorandom noise sequences generated by the upper and the lower linear feedback shift registers are modulo-2 added together to produce the n-bit spreading code.

15. The transponder of claim 1, further comprising a threshold/trigger circuit to detect the interrogation signal and apply power to the transponder in response to the interrogation signal.

16. A system, comprising:
  a set of one or more transponders, wherein each of the transponders comprises:
    a clock generator that generates a transmit clock based on an interrogation signal;
    a code generator that generates an n-bit spreading code from a unique set of at least two spreading codes allocated to the transponder from among a plurality of available spreading codes using the transmit clock, wherein the code generator inputs a set of address bits and a set of data bits from a storage device and generates the n-bit spreading code based on the set of address bits and the set of data bits, wherein the set of at least two spreading codes are allocated to the transponder based on transponder identification information;
    a signal generator that transmits a transponder signal that includes the n-bit spreading code, the transponder signal having a transmit frequency determined by the transmit clock; and
  a detector that receives transponder signals transmitted by the one or more transponders and examines the received transponder signals to detect presence of one or more spreading codes.

17. The transponder of claim 1, wherein the code generator generates the n-bit spreading code based on transponder identification information and monitored data information.

18. The transponder of claim 1, wherein the spreading code comprises an n-bit spreading code including k assigned bits that comprise the transponder identification information, where k is greater than or equal to one and less than n.

19. The transponder of claim 18, wherein the k assigned bits comprise a unique transponder address.

20. The transponder of claim 18, wherein the k assigned bits comprise the k most significant bits of the n-bit spreading code.

21. The transponder of claim 18, wherein the k assigned bits comprise the k least significant bits of the n-bit spreading code.

22. The transponder of claim 18, wherein at least two of the k assigned bits are non-consecutive bits of the n-bit spreading code.

23. The transponder of claim 1, wherein the code generator generates the n-bit spreading code from transponder identification information and monitored data information.

24. The transponder of claim 23, wherein the monitored data information comprises one of status information concerning the transponder, status information concerning an object with which the transponder is associated, or status information concerning an environment in which the transponder is located.

25. The system of claim 16, wherein the detector identifies which of the one or more transponders transmitted the received transponder signals based on presence of the one or more spreading codes.

26. The system of claim 16, wherein the detector identifies data conveyed by the received transponder signal based on the n-bit spreading code.

27. The system of claim 26, wherein each of the transponders is associated with one of an object or an environment to be monitored, and wherein the data conveyed by the n-bit spreading code is status information concerning the object or the environment to be monitored.

28. The system of claim 16, wherein the detector includes a processor that performs a correlation of each received signal with an ideal code correlator for each spreading code in the system.

29. The system of claim 28, wherein the processor compares the correlation to detection criterion to detect presence of any one of the spreading codes in the system.

30. The system of claim 29, wherein the detection criterion comprises a threshold detection criterion.

31. The system of claim 30, wherein the threshold detection criterion changes as a function of time.

32. The system of claim 28, wherein the detector includes a code allocation lookup table that maps transponders to their allocated spreading codes, and wherein the processor accesses the code allocation lookup table to identify which transponder transmitted the n-bit spreading code and to identify data conveyed by the spreading code.

33. The system of claim 16, wherein the transponders and the detector communicate asynchronously.

34. The system of claim 16, wherein the clock generator frequency modulates the interrogation signal to generate the transmit clock.

35. The system of claim 16, wherein the clock generator comprises one of a clock divider or a multiplier.

36. The system of claim 16, wherein the clock generator comprises a clock divider that generates a transmit clock that is approximately one-half the frequency of the interrogation signal.

37. The system of claim 16, wherein the clock generator comprises a clock divider comprising a divide-by-n circuit.

38. A system, comprising:
  an interrogator that sends an interrogation signal;
  a set of one or more transponders, each of which is allocated a unique set of at least two spreading codes from a plurality of spreading codes, and each of which transmits a transponder signal containing an n-bit spreading code from among the allocated spreading codes in response to the interrogation signal, each transponder including a code generator that inputs a set of address bits and a set of data bits from a storage device and generates the n-bit spreading code based on the set of address bits and the set of data bits, wherein the set of at least two spreading codes are allocated to each of the one or more transponders based on transponder identification information; and a detector that asynchronously examines received signals to detect presence of one or more of the plurality of spreading codes.

39. The system of claim 38, wherein the detector includes a processor that performs a correlation between a sample of the received signals and an ideal code correlator for each of the plurality of spreading codes.

40. The system of claim 39, wherein the processor performs the correlation using discrete Fourier transforms.

41. The system of claim 40, wherein the ideal code corrrelators are stored as a Fourier representation of an ideal transponder signal.

42. The system of claim 39, wherein the processor performs the correlation using a discrete circular correlation.

43. The system of claim 39, wherein the processor compares the correlation to detection criterion to determine whether the sample of the received signals includes any of the spreading codes.

44. The system of claim 39, wherein the detection criterion comprises a threshold detection criterion.

45. The system of claim 44, wherein a threshold value of the threshold detection criterion adjusts as a function of time.

46. The system of claim 38, further comprising a code allocation lookup table that maps each of the one or more transponders to their allocated unique set of spreading codes, and wherein the detector accesses the code allocation lookup table to identify which of the one or more transponders transmitted the detected n-bit spreading code and to identify data conveyed by the detected spreading code.

47. The system of claim 38, wherein each of the one or more transponders includes:

a clock generator that generates a transmit clock based on the interrogation signal;

the code generator that generates the n-bit spreading code from the unique set of at least two spreading codes allocated to the transponder using the transmit clock; and a signal generator that transmits a coded transponder signal that includes the n-bit spreading code generated by the code generator, the transponder signal having a transmit frequency determined by the transmit clock.

48. The system of claim 47, wherein the clock generator generates a frequency modulated clock.

49. The system of claim 47, wherein the clock generator comprises a clock divider.

50. A transponder comprising:

a clock generator that receives an interrogation signal having an interrogation frequency and generates therefrom a transmit clock having a transmit frequency that is a defined fraction of the interrogation frequency;

a code generator that generates an n-bit spreading code from transponder identification information and monitored data information, wherein the code generator inputs a set of address bits and a set of data bits from a storage device and generates the n-bit spreading code based on the set of address bits and the set of data bits, wherein the n-bit spreading code is generated from a unique set of at least two spreading codes allocated to the transponder based on the transponder identification information; and a signal generator that transmits, at the transmit frequency, a transponder signal that includes the n-bit spreading code.

51. The transponder of claim 50, wherein the code generator generates an n-bit spreading code, and wherein the transponder identification information comprises k assigned address bits within the n-bit spreading code, where k is greater than or equal to one and less than n.

52. The transponder of claim 51, wherein the monitored data information comprises (n-k) bits within the n-bit spreading code.

53. The transponder of claim 50, wherein the monitored data information comprises one of status information concerning the transponder, status information concerning an object with which the transponder is associated, or status information concerning an environment in which the transponder is located.

* * * * *

UNITED STATES PATENT AND TRADEMARK OFFICE
CERTIFICATE OF CORRECTION

PATENT NO. : 7,643,536 B2 Page 1 of 1
APPLICATION NO. : 10/915576
DATED : January 5, 2010
INVENTOR(S) : Schaefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1402 days.

Signed and Sealed this

Sixteenth Day of November, 2010

David J. Kappos
*Director of the United States Patent and Trademark Office*